INVENTORS
Yasuharu Kuwahara
Satoshi Hoshino
By Stevens, Davis, Miller + Mosher
ATTORNEYS 3,199,426
STABILIZER FOR FUNDUS CAMERAS
Yasuharu Kuwahara, Tokyo, and Satoshi Hoshino, Showa-ku, Nagoya-shi, Japan, assignors to Kowa Company Ltd., Nagoya, Japan, a corporation of Japan
Filed Jan. 28, 1963, Ser. No. 254,254
Claims priority, application Japan, Jan. 31, 1962,
(utility model) 37/3,244
1 Claim. (Cl. 95—11)

In a hand grip type fundus camera (camera for eye-ground), the illuminating prism must, for illumination of eye-ground, be brought as near as, for example 8 m.m. to the cornea of the patient before the observation of the eye-ground becomes possible, but it is very difficult for the inspector to maintain this space of, for example 8 m.m. correctly and strictly without any support, for a slight movement of the body of the inspector or the patient will disturb this space, adjustment of the focus getting very difficult. Moreover, as strength gathers to the fingers in releasing the shutter, the camera may be shaken, the quality of the picture being degraded, and sometimes the picture filmer is incomplete. Much more so is it difficult, when the patient is lying down, to carry out these operations without any support.

The present invention is to be applied chiefly to such hand grip type fundus cameras, which removes the defects mentioned above and makes stable observation and photographing posible. The embodiment of the present invention will be explained in reference to the appended drawings.

Figure 1:
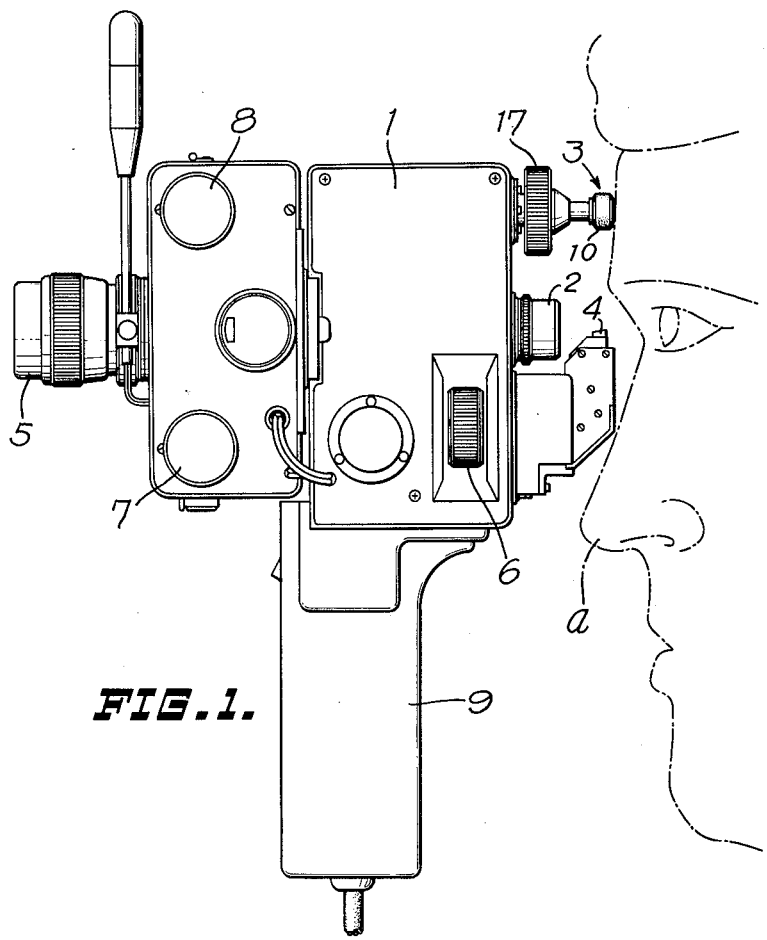
Figure 2:
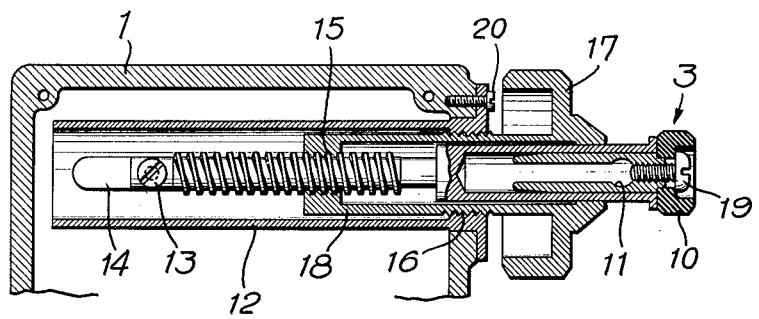

In the drawings:
FIGURE 1 is a side view of the device of the present invention; and
FIGURE 2 is an enlarged sectional side view of the essential parts thereof.

As shown in the appended drawings, at the frontal face of the camera body 1 is projected in a position a little upward the objective lens portion 2, a bearing piece 3 to be borne by the forehead of the patient a, the length of the piece being freely adjustable. In the drawings, 4 represents the illuminating prism at the frontal face of the camera body 1, 5 the eye-piece portion at the back faces 6, 7, 8 a knob for adjusting the focus at the side thereof and knobs respectively for winding up and winding back of the film, and 9 a grip handle projected in elongation downwardly. And the bearing piece 3 is provided, for example, in the double helicoid type, as shown clearly in FIG. 2, namely, the bearing piece 3 is formed in a screw rod and at the end portion thereof that contacts the forehead of the patient is detachably attached an applying rubber 10 by the medium of a seat piece 11, and at the same time the inner end side is screwed by means of the screw 15 at the internal peripheral surface with which is encased a fitting cylinder 12 fixed on the side of the camera body 1 and is engaged and borne slidably forwardly and backwardly by a guide shaft 13 and a guide groove 14 so as not to rotate, while the inner portion is screwed to the internal surface of the end portion of the fitting cylinder 12 by means of the screw 16 on the external peripheral surface, to form a rotary cylinder 18 provided with a rotary ring 17 in combination. With the rotation of the rotary ring 17, the so-called double helicoid at both screws 15, 16 gives an advancing or retreating movement to the bearing piece 3, accordingly to the applying rubber 10 at the end, and consequently when the applying rubber 10 is applied to the forehead of the patient a and the rotary ring 17 is turned, the space between the camera body 1 and the patient a can freely be changed. In the drawing, 19 is a screw for connecting the applying rubber 10 to the seat piece 11 thereof, and 20 is a screw for fixing the fitting cylinder 12.

The present device is used, as illustrated in FIG. 1, with its bearing piece 9 applied to the forehead of the patient, and the projected length of the member is adjusted properly to meet the need. With the use of the present invention the camera can readily be stabilized by utilizing the forehead of the patient, regardless of the posture and the like of the patient. And as the distance to the eyes can be changed freely, the adjustment of the focus is easy, and the slightest shaking of the camera can be avoided almost entirely, and thus it has the effect of being very handy and of having a simple construction.

We claim:
A stabilizing device for a fundus camera comprising a fitting cylinder secured on upper portion of said camera and extending in the interior of said camera, said fitting cylinder being provided in its peripheral wall with longitudinal guide grooves and having a thread provided on the inner peripheral surface of one end of said cylinder, a rotary cylinder having a thread adapted to engage with said thread on said fitting cylinder and having a rotary ring integral with it, a screw rod having at its end a bearing piece extending through said rotary ring and adapted to engage with the other end of said rotary cylinder, and said screw rod being provided with a guide means engaging in said guide groove to prevent it from turning with said rotary cylinder.

References Cited by the Examiner
UNITED STATES PATENTS
2,586,973   2/52   McMillin _____ 95—11
2,866,395   12/58  Manning _____ 95—11

JOHN M. HORAN, Primary Examiner.
NORTON ANSHER, Examiner.